(12) United States Patent
Chikkala et al.

(10) Patent No.: US 11,540,121 B2
(45) Date of Patent: Dec. 27, 2022

(54) PRIORITY FALLBACK OF SUCI CALCULATION

(71) Applicant: QUALCOMM Incorporated, San Diego, CA (US)

(72) Inventors: Venkata Durga Vinod Chikkala, Hyderabad (IN); Naga Chandan Babu Gudivada, Hyderabad (IN); Phani Pradeep Kumar Kothapalli Venkata, Hyderabad (IN); Rajendra Prasad Nelurouth, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/019,795

(22) Filed: Sep. 14, 2020

(65) Prior Publication Data
US 2021/0176628 A1    Jun. 10, 2021

(30) Foreign Application Priority Data

Dec. 5, 2019   (IN) .............................. 201941050143

(51) Int. Cl.
*H04W 12/033*    (2021.01)
*H04W 76/18*     (2018.01)
*H04W 12/06*     (2021.01)
*H04W 12/082*    (2021.01)

(52) U.S. Cl.
CPC ......... *H04W 12/033* (2021.01); *H04W 12/06* (2013.01); *H04W 12/082* (2021.01); *H04W 76/18* (2018.02)

(58) Field of Classification Search
CPC . H04W 12/033; H04W 12/06; H04W 12/082; H04W 76/18; H04W 12/72
See application file for complete search history.

(56) References Cited

U.S. PATENT DOCUMENTS

| | | | |
|---|---|---|---|
| 10,499,357 B1* | 12/2019 | Tiwari | H04W 12/08 |
| 2011/0167440 A1* | 7/2011 | Greenfield | H04L 63/107 |
| | | | 455/411 |
| 2016/0241550 A1* | 8/2016 | Burch | G06F 21/45 |
| 2018/0227866 A1* | 8/2018 | Jung | H04L 5/0053 |
| 2020/0204985 A1* | 6/2020 | An | H04W 12/03 |
| 2020/0267544 A1* | 8/2020 | Nakarmi | H04W 8/20 |
| 2021/0092603 A1* | 3/2021 | Yang | H04L 9/16 |
| 2021/0368345 A1* | 11/2021 | Nakarmi | H04W 12/72 |

OTHER PUBLICATIONS

Chandramouli et al., Access Control and Mobility Management, 5G for the Connected World, Feb. 2019, pp. 225-282 (Year: 2019).*

* cited by examiner

*Primary Examiner* — Kenneth W Chang
(74) *Attorney, Agent, or Firm* — Holland & Hart LLP

(57) ABSTRACT

Method and apparatus are provided for priority fallback of SUCI calculation. In accordance with some implementation, a UE may transmit, in response to receiving an indication of authentication failure for a first SUCI based on a first SUCI parameter, a second SUCI based on a second SUCI parameter different from the first SUCI parameter. In accordance with some implementation, the UE may further transmit a SUCI with NULL SUCI parameter if the UE determines all SUCI parameters supported by the UE has been rejected by the network.

24 Claims, 8 Drawing Sheets ically, to methods and apparatus for subscription concealed identifier (SUCI).

PRIORITY FALLBACK OF SUCI CALCULATION

CLAIM OF PRIORITY

This application claims priority to Indian Provisional patent Application No 201941050143, titled "PRIORITY FALLBACK OF SUCI CALCULATION" filed Dec. 5, 2019, which is hereby incorporated by reference in its entirety.

TECHNICAL FIELD

The present disclosure relates generally to wireless communication systems, and more particularly, to methods and apparatus for subscription concealed identifier (SUCI).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of NR may be based on the Long Term Evolution (LTE) standard. There exists a need for further improvements in 5G NR technology. These improvements may also be applicable to other multi-access technologies and the telecommunication standards that employ these technologies.

Further, while access to services in an LTE based network was associated with a user equipment (UE) international mobile subscriber identity (IMSI), services in a 5G NR based network are associated with a UE Subscription Permanent Identifier (SUPI). The SUPI may be further modified to generate a Subscription Concealed Identifier (SUCI) which contains a concealed SUPI. As such, there is a need to improve the access mechanism related to SUCI.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes receiving a request message for a subscription concealed identifier (SUCI), transmitting to a network entity a first SUCI based on a first highest priority SUCI parameter from a plurality of SUCI parameters available to the UE, receiving a rejection message including an indication of authentication failure, and transmitting a second SUCI based on a second SUCI parameter that is different from the first highest priority SUCI parameter. In an aspect, the first highest priority SUCI parameter and the second SUCI parameter may be SUCI parameters supported by the UE and the network entity. In an aspect, the second SUCI parameter may be the next highest priority SUCI parameter in the plurality of SUCI parameters. In an aspect, the UE may additionally determine in response to receiving a rejection message whether all SUCI parameters in the plurality of SUCI parameters have been rejected by the network entity, then transmit a SUCI based on a NULL SUCI parameter. In an aspect, the UE may additionally determine in response to receiving a rejection message whether all SUCI parameters in the plurality of SUCI parameters have been rejected by the network entity, then disconnect from the network entity. In an aspect, the network entity may be a unified data management (UDM) and transmitting to the network entity may comprise transmitting to the UDM via a base station.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
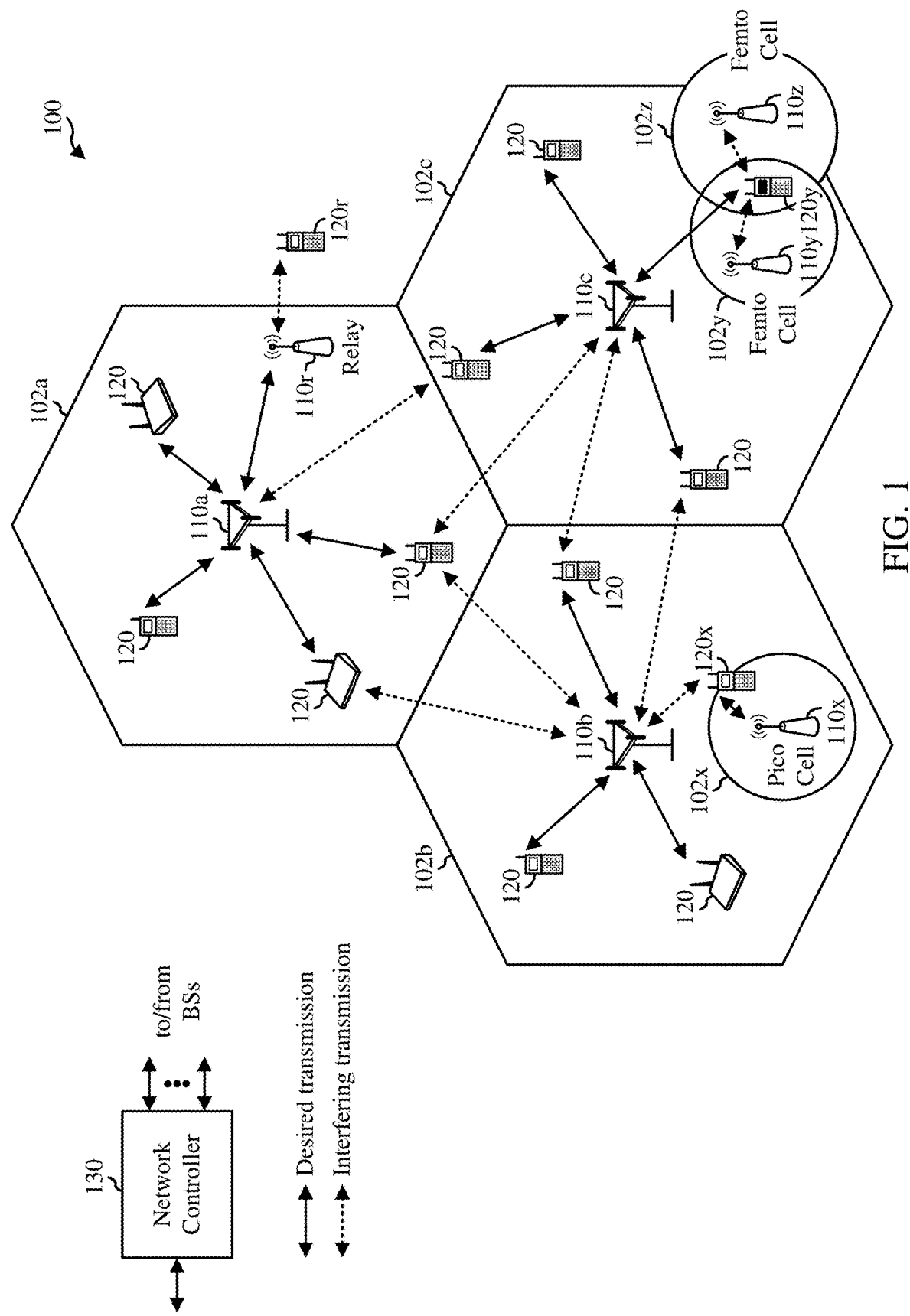
FIG. 1 is a block diagram conceptually illustrating an example telecommunications system, in accordance with certain aspects of the present disclosure.

A globally unique 5G subscription unit permanent identifier (SUPI) may be allocated to each UE in a 5G based network, similar to how an international mobile subscriber identity (IMSI) was used in Pre-5G based networks. A SUPI would uniquely identify a UE in the network. Concealment of the SUPI may be used to protect privacy. When a UE intends to indicate its SUPI to the 5G network with privacy, the UE may provide the SUPI in concealed format called a subscription concealed identifier (SUCI). With a 5G based UICC, a SUCI may be calculated based on elementary files (EFs), such as EFs in an EF universal subscriber identity module (USIM) service table (EF-UST) (e.g., service 124, service 125 in EF-UST) and parameters present in EFs, (e.g., parameters in EF-Suci_Calc_Info as defined in 3GPP TS 31.102). SUCI may be used for UE authentication in registration procedure to camp on a 5G NR based network, thereby allowing access to 5G NR services.

According to 3GPP TS 31.102, a UE may consider only a single highest priority SUCI parameter the UE supports for calculating a SUCI. However, SUCI authentication may fail at the network (e.g., UDM) due to multiple reasons. If SUCI authentication fails at the network, because the UE considers only a single highest priority SUCI parameter for calculating SUCI, SUCI authentication will always fail even though the UE may support connection to the network and have a valid UICC. It may be desirable to improve the SUCI procedure to allow valid UEs (i.e., UE capable of connecting to the network and with network enable UICC) to camp to the network.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a healthcare device, a medical device, a wearable device such as a smart watch, smart clothing, smart glasses, virtual reality goggles, a smart wrist band, smart jewelry (e.g., a smart ring, a smart bracelet, etc.), an entertainment device (e.g., a music device, a gaming device, a video device, a satellite radio, etc.), a vehicular component or sensor, a smart meter/sensor, industrial manufacturing equipment, a positioning device (e.g., GPS, Beidou, GLONASS, Galileo, terrestrial-based), or any other suitable device that is configured to communicate via a wireless or wired medium. Some UEs may be considered machine-type communication (MTC) devices or enhanced or evolved MTC (eMTC) devices. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Some UEs may be considered Internet of Things devices. The Internet of Things (IoT) is a network of physical objects or "things" embedded with, e.g., electronics, software, sensors, and network connectivity, which enable these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure. Narrowband IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices. MTC/eMTC and/or IoT UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using time division duplex (TDD). A single component carrier bandwidth of 100 MHz may be supported. NR resource blocks may span 12 subcarriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such as central units (CU) and/or distributed units (DU).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
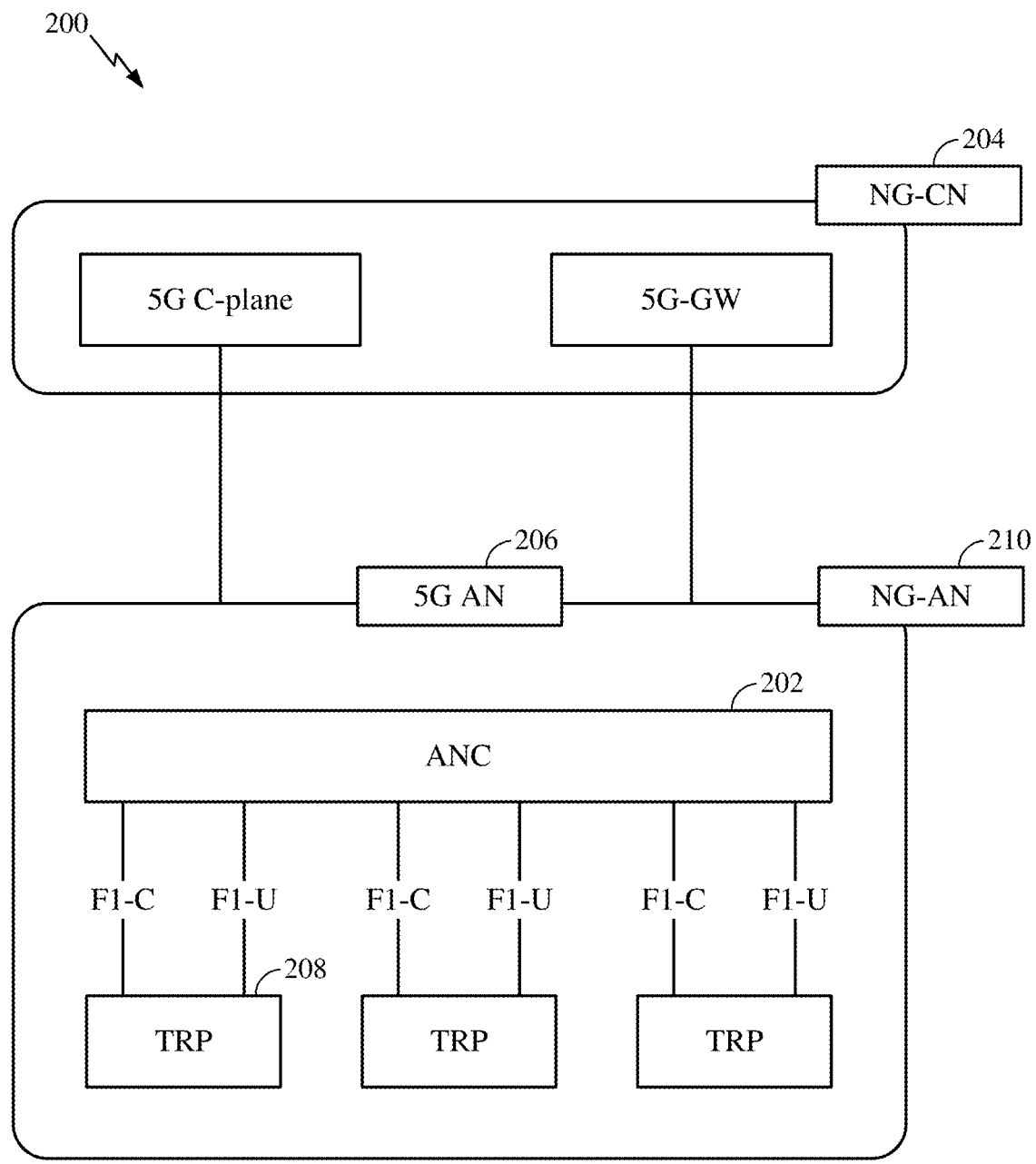
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
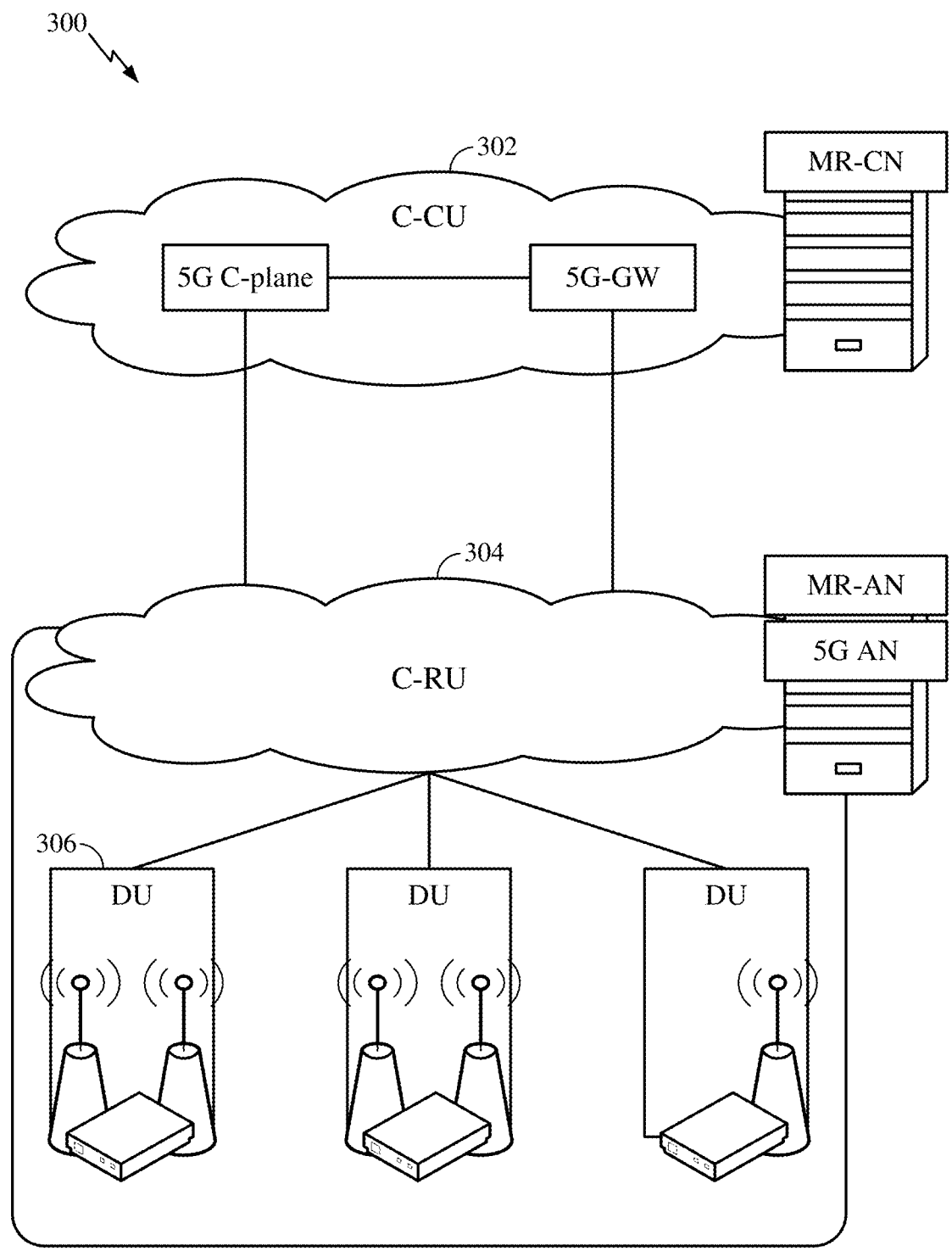
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
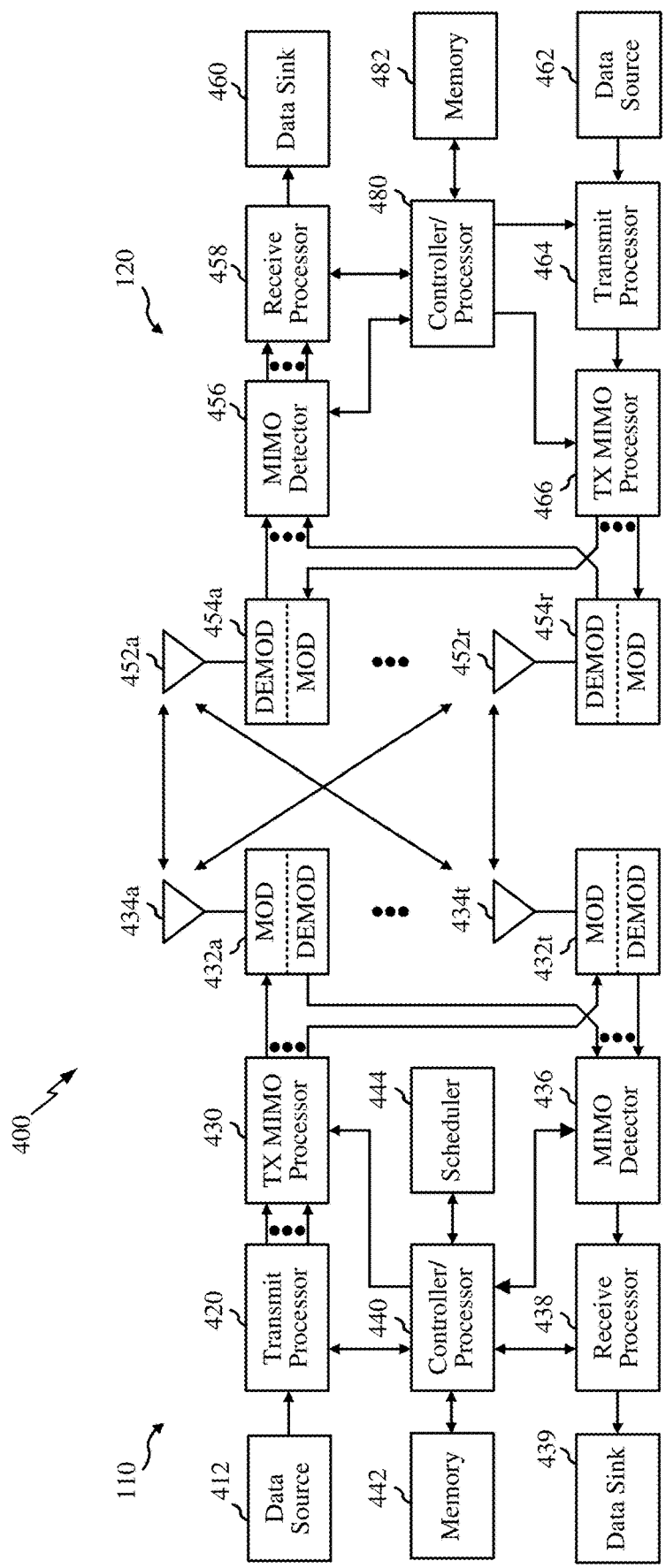
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the BS 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the processes for the techniques described herein. The processor 480 and/or other processors and modules at the UE 120 may also perform or direct, e.g., execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

In certain aspects, a globally unique 5G subscription unit permanent identifier (SUPI) may be allocated to each UE in a 5G based network, similar to how an international mobile subscriber identity (IMSI) was used in Pre-5G based networks. A SUPI would uniquely identify a UE in the network. Concealment of the SUPI may be used to protect privacy. When a UE intends to indicate its SUPI to the 5G network with privacy, the UE may provide the SUPI in concealed format called a subscription concealed identifier (SUCI). With a 5G based UICC, a SUCI may be calculated based on elementary files (EFs), such as EFs in an EF universal subscriber identity module (USIM) service table (EF-UST) (e.g., service 124, service 125 in EF-UST) and parameters present in EFs, (e.g., parameters in EF-Suci_Calc_Info as defined in 3GPP TS 31.102 Release 15). For example, protection schemes (e.g., ECIES A, ECIES B, a proprietary scheme, etc.) may be used to calculate the SUCI using values such as, but not limited to, the Home Network Public key configured in EF-Suci_Calc_Info. Thereafter, the SUCI may be used for registration procedure to camp on a 5G NR based network, thereby allowing access to 5G NR services.

Figure 5:
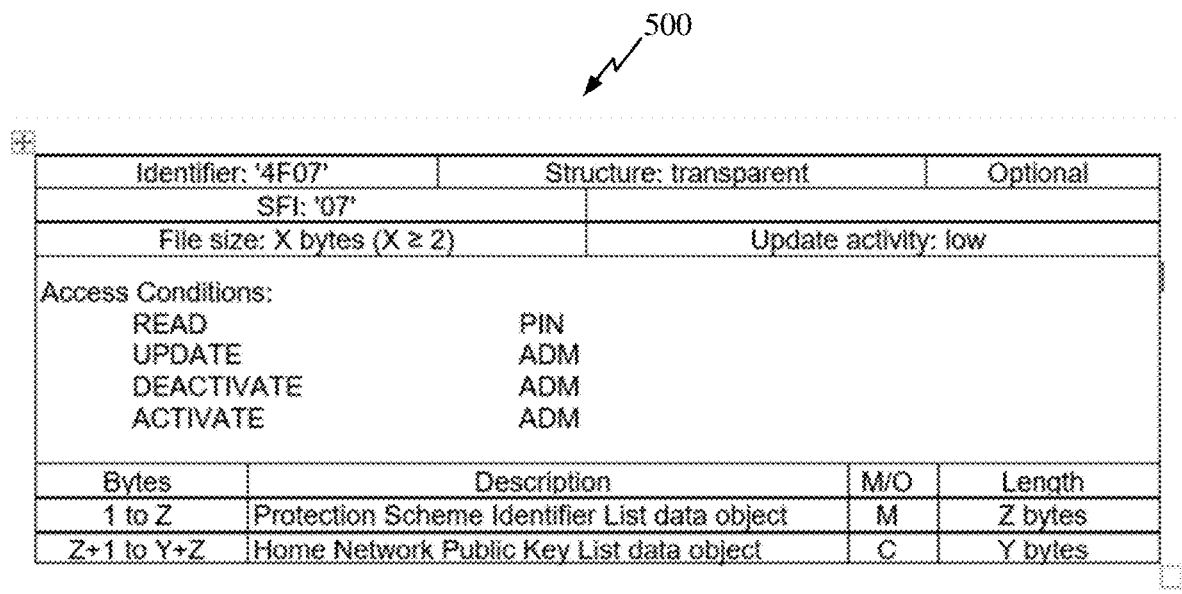
FIG. 5 illustrates an example EF-Suci-Calc_Info as defined in 3GPP TS 31.102.

FIG. 5 illustrates an example EF-Suci-Calc_Info 500 as defined in 3GPP TS 31.102. As illustrated in FIG. 5, an EF-Suci-Calc_Info may include Z bytes of Protection Scheme Identifier List and Y bytes of Home Network Public Key List that are used to calculate a SUCI. The calculated SUCI may be sent by the UE to the network (e.g., unified data management (UDM)). The UDM may use subscription data stored in a unified data repository (UDR) and implement the application logic to perform various functionalities such as authentication, credential generation, user identification, and service and session continuity.

Figure 6:
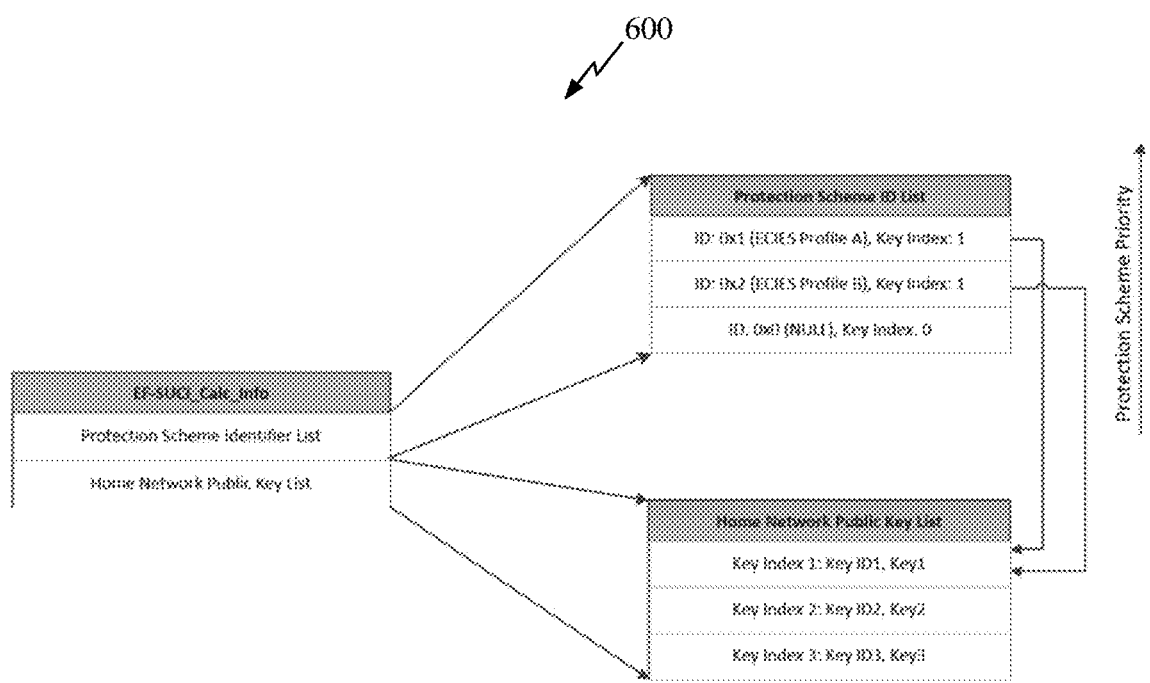
FIG. 6 illustrates a detailed example of EF-Suci_Calc_Info.

FIG. 6 illustrates a detailed example EF-Suci_Calc_Info 600. The Protection Scheme Identifier List in EF-Suci_Calc_Info may include a plurality of protection scheme identifiers. The protection scheme identifiers may be listed in an order of priority. Each protection scheme identifier may identify a protection scheme (e.g., ECIES A, ECIES B, a proprietary scheme, NULL) to use for SUCI generation and may provide a key to use for the identified protection scheme. The key may be provided by identifying an index to the Home Network Public Key List. For example, as depicted in FIG. 6, a first entry of the Protection Scheme Identifier List may specify ECIES Profile A as the protection scheme and specify a key as the first entry of the Home Network Public Key List. For example, as depicted in FIG. 6, a second entry in Protection Scheme Identifier List may specify a different protection scheme but use the same key. For example, as depicted in FIG. 6, a third entry in Protection Scheme Identifier List may specify a NULL protection scheme (i.e., no protection scheme used) with no key (i.e., key index 0).

In certain aspects, according to 3GPP TS 31.102, a UE may consider only a single highest priority SUCI parameter (e.g., highest priority entry in the Protection Scheme ID List in EF-Suci_Calc_Info that the UE supports) from EF-Suci_Calc_Info for calculating a SUCI. Note that not all protection scheme identifiers present in the Protection Scheme ID List may be supported by the UE and thus the highest priority SUCI parameter may be the highest priority SUCI parameter that the UE supports. For example, in FIG. 6, the UE may consider the first index protection scheme identifier that the UE may support in the Protection Scheme ID List. The calculated SUCI may be transmitted to a network entity (e.g., UDM) for user identity authentication and registration.

In certain aspects, SUCI authentication may fail at the network (e.g., UDM) due to multiple reasons including but not limited to: (1) Home Network Public Key or its identifier may not be configured properly in the UICC, (2) proprietary protection scheme supported by the UE may not be supported by the network (e.g., UDM), and (3) synchronization issues between the UICC and the network (e.g., UDM). If SUCI authentication fails at the network, because the UE considers only a single highest priority SUCI parameter for calculating SUCI, SUCI authentication will always fail even though the UE may have a valid UICC and support connection to the network (e.g., 5G NR). For example, no further SUCI may be sent to the network or UE may retransmit SUCI based on the same SUCI parameter that failed authentication. SUCI authentication failure will result in the UE failing registration with the network (e.g., 5G NR) and consequently the UE may not be able to camp to the network (e.g., 5G NR). SUCI authentication failure for a UE with a valid UICC may result in loss of valuable customers for the operators and may make the UE unusable for connecting to the network for end customers. It may be desirable to improve the process of calculating SUCI to allow valid UEs (i.e., UE capable of connecting to the network and with network enable UICC) to camp to the network.

Example Priority Fallback of SUCI Calculation

In certain circumstances, SUCI authentication may fail at the network even for a UE capable of connecting to the network and with a network enable UICC. In an aspect, UE may not recover from the SUCI authentication failure because the UE may be restricted only to the highest priority SUCI parameter for SUCI calculation. In an aspect, the UE may not be able to camp to the network after a SUCI authentication failure.

In certain aspects, a UE may consider other available SUCI parameters supported by the UE if the authentication fails, rather than only considering a single highest priority SUCI parameter for SUCI calculation. In certain aspects, the UE may transmit a SUCI based on a different SUCI parameter if the initial SUCI fails authentication. Consideration of other available SUCI parameters supported by the UE may allow the UE to camp to the network and may result in increased number of valid UEs accessing the network.

Figure 7:
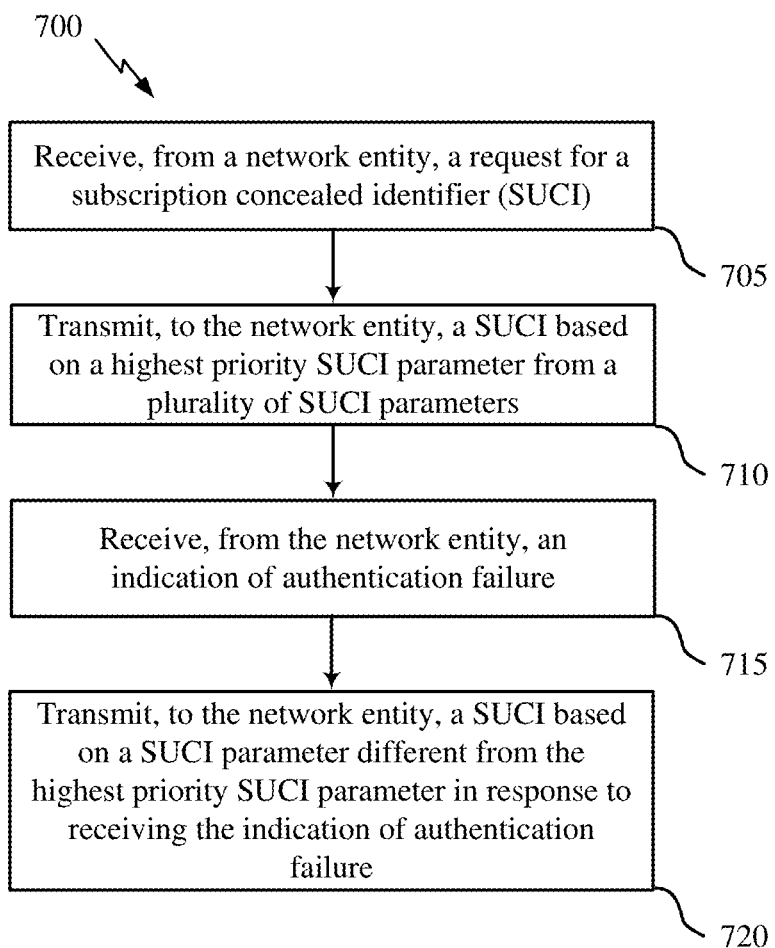
FIG. 7 illustrates an example priority fallback of SUCI calculation operation.

FIG. 7 illustrates an example priority fallback of SUCI calculation operation 700. According to the operation 700 in FIG. 7, in step 705, a UE may receive a request message for a subscription concealed identifier (SUCI) from a network entity. In an aspect, the network entity may be a unified data management (UDM). In an aspect, the request may be received from a UDM via a base station. According to the operation 700 in FIG. 7, in step 710, the UE may transmit a first SUCI based on a first SUCI parameter from a plurality of SUCI parameters available to the UE, wherein the first SUCI parameter is a highest priority SUCI parameter in the plurality of SUCI parameters. For example, the plurality of SUCI parameters may be the SUCI parameters in the Protection Scheme ID List in EF-Suci_Calc_Info. In an aspect, the highest priority SUCI parameter may be the highest priority SUCI parameter that is supported by the UE. For example, the highest priority SUCI parameter may be the first entry in the Protection Scheme ID List that is supported by the UE. In an aspect, the transmission to the network entity may be transmitted to a UDM via a base station. According to the operation 700 in FIG. 7, in step 715, the UE may receive a rejection message including an indication of authentication failure from the network entity. In an aspect, the network entity may be a unified data management (UDM). In an aspect, the request may be received via a base station.

According to the operation 700 in FIG. 7, in step 720, the UE may transmit to the network entity a second SUCI based on a second SUCI parameter different from the first SUCI parameter in response to receiving the rejection message. For example, the plurality of SUCI parameters may be the SUCI parameters in the Protection Scheme ID List of EF-Suci_Calc_Info. In an aspect, the second SUCI parameter may be a SUCI parameter that is next in priority, i.e., priority fallback. In an aspect, the second SUCI parameter may be a SUCI parameter supported by the UE that is next in priority.

Still referring to FIG. 7, the UE may optionally send a third SUCI based on a third SUCI parameter different from the first SUCI parameter and the second SUCI parameter in response to receiving a rejection message including an indication of authentication failure after transmitting the second SUCI. In an aspect, the third SUCI parameter may be the highest priority SUCI parameter supported by the UE apart from the first and second SUCI parameter, i.e., priority fallback. This step may be repeated until all SUCI parameters supported by the UE are exhausted. For example, all SUCI parameters supported by the UE may be exhausted when all entries supported by the UE in the Protection Scheme ID List has been used to calculate a SUCI and has been rejected by the network.

Although not shown in FIG. 7, as an optional step, the UE, in response to receiving a rejection message including an indication of authentication failure, may determine whether all SUCI parameters in the plurality of SUCI parameters have been rejected by the network entity. In an aspect, UE may consider only SUCI parameters that are supported by the UE in determining whether all SUCI parameters in the plurality of SUCI parameters have been rejected by the network entity. As an optional step, the UE may send a SUCI with NULL SUCI parameters to the network entity based on the determination. In an aspect, the UE may send a SUCI with NULL SUCI parameters if the UE determines that all SUCI parameters supported by the UE have failed authentication by the network entity. Alternatively, as an optional step, the UE may disconnect from the network based on the determination. In an aspect, the UE may disconnect from the network entity if the UE determines that all SUCI parameters supported by the UE have failed authentication by the network entity. The UE may subsequently search for a different cell to connect to.

Figure 8:
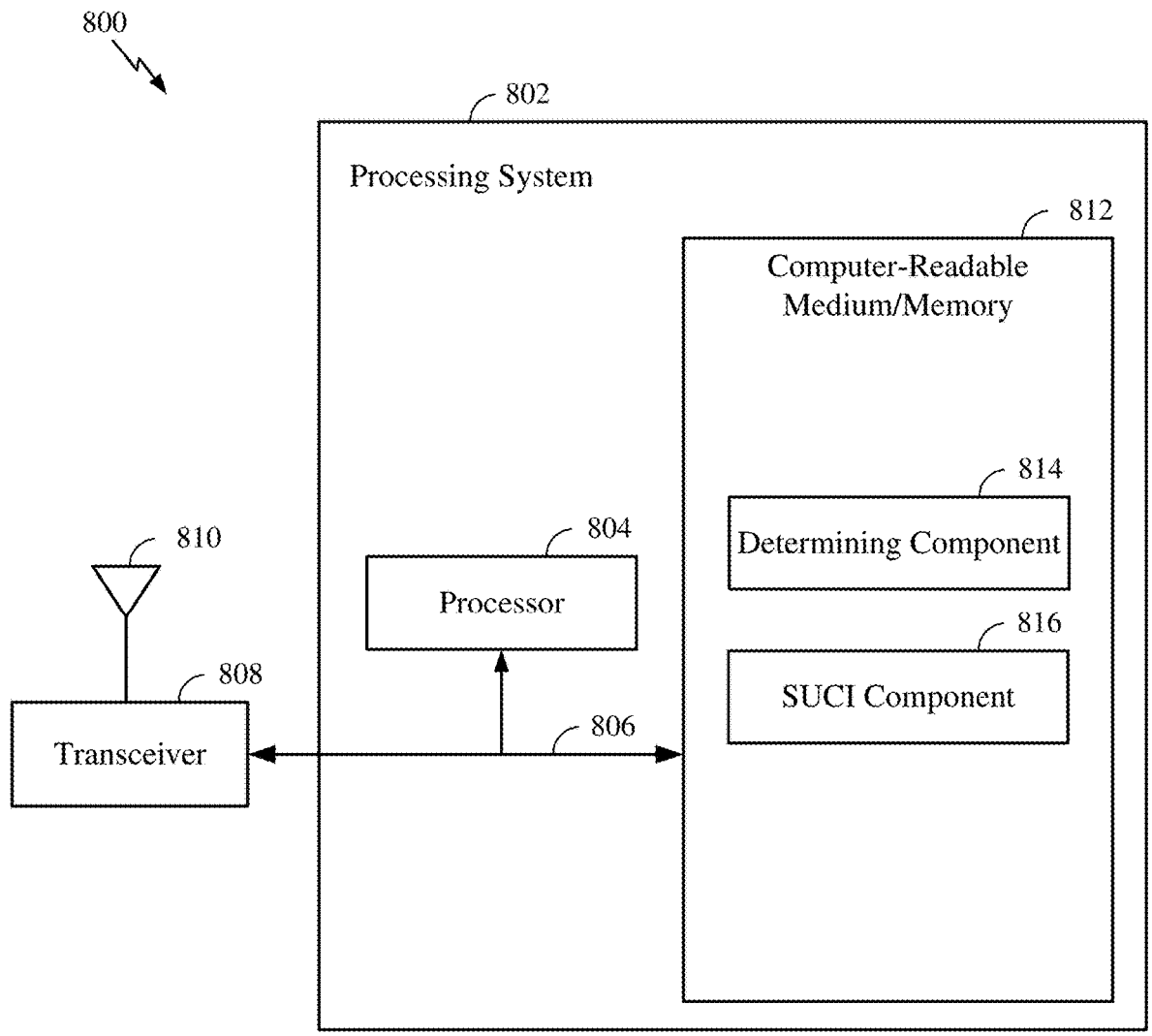
FIG. 8 illustrates a communications device 800 that may include various components configured to perform aspects of the present disclosure.

FIG. 8 illustrates a communications device 800 that may include various components (e.g., corresponding to means-plus-function components) configured to perform operations for the techniques disclosed herein, such as the operations illustrated in FIG. 7, and other aspects described herein and illustrated in the drawings. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 7, or other operations for performing the various techniques discussed herein. In certain aspects, computer-readable medium/memory 812 stores code 814 for determining whether to a SUCI failed authentication, determining whether all SUCI parameters supported by a UE have been rejected by the network. In certain aspects, computer-readable medium/memory 812 stores code 816 for calculating SUCI based on the highest priority SUCI parameter, selecting and calculating SUCI based on a SUCI parameter different form the highest priority SUCI parameter, and calculating SUCI based on NULL SUCI parameter.

In certain aspects, the processor 804 has circuitry configured to implement the code stored in the computer-readable medium/memory 812. The processor 804 includes circuitry (not illustrated) for determining whether to a first SUCI failed authentication, determining whether all SUCI parameters supported by a UE have been rejected by the network, calculating SUCI based on the highest priority SUCI parameter, selecting and calculating SUCI based on a SUCI parameter different form the highest priority SUCI parameter, and calculating SUCI based on NULL SUCI parameter.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120.

Additionally, means for obtaining, means for designating, means for aggregating, means for collecting, means for selecting, means for switching, and means for detecting may comprise one or more processors, such as the controller/processor 480, transmit processor 464, receive processor 458, and/or MIMO processor 466 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication performed by a user equipment (UE), comprising:
   receiving, from a network entity, a request message for a subscription concealed identifier (SUCI);
   transmitting, to the network entity, a first SUCI based on a first SUCI parameter from a plurality of SUCI parameters available to the UE, wherein the first SUCI parameter is a highest priority SUCI parameter in the plurality of SUCI parameters;
   receiving, from the network entity, a rejection message including an indication of authentication failure; and
   transmitting, to the network entity and in response to receiving the rejection message, a second SUCI based on a second SUCI parameter from the plurality of SUCI parameters, wherein the second SUCI parameter is different from the first SUCI parameter and based at least in part on determining whether all SUCI parameters supported by the UE in the plurality of SUCI parameters have been rejected by the network entity.

2. The method of claim 1, wherein the first SUCI parameter and the second SUCI parameter are SUCI parameters supported by the UE.

3. The method of claim 1, wherein the second SUCI parameter is a next highest priority SUCI parameter in the plurality of SUCI parameters.

4. The method of claim 1, further comprising:
   determining, by the UE and in response to receiving the rejection message including the indication of authentication failure, that all SUCI parameters supported by the UE in the plurality of SUCI parameters have been rejected by the network entity,
   wherein transmitting the second SUCI comprises transmitting, to the network entity and based on the determination, a SUCI based on a NULL SUCI parameter.

5. The method of claim 1, further comprising:
   receiving, from the network entity, a second rejection message including a second indication of authentication failure;
   determining, by the UE and in response to receiving the second rejection message including the second indication of authentication failure, that all SUCI parameters supported by the UE in the plurality of SUCI parameters have been rejected by the network entity; and
   disconnecting, based on the determination, from the network entity.

6. The method of claim 1, wherein the network entity is a unified data management (UDM) and wherein transmitting to the network entity comprises transmitting to the UDM via a base station.

7. A user equipment (UE) for wireless communication, comprising:
   a memory; and
   at least one processor coupled with the memory and configured to:
      receive, from a network entity, a request message for a subscription concealed identifier (SUCI);
      transmit, to the network entity, a first SUCI based on a first SUCI parameter from a plurality of SUCI parameters available to the UE, wherein the first SUCI parameter is a highest priority SUCI parameter in the plurality of SUCI parameters;
      receive, from the network entity, a rejection message including an indication of authentication failure; and
      transmit, to the network entity and in response to receiving the rejection message, a second SUCI based on a second SUCI parameter from the plurality of SUCI parameters, wherein the second SUCI parameter is different from the first SUCI parameter and based at least in part on a determination of whether all SUCI parameters supported by the UE in the plurality of SUCI parameters have been rejected by the network entity.

8. The UE of claim 7, wherein the first SUCI parameter and the second SUCI parameter are SUCI parameters supported by the UE.

9. The UE of claim 7, wherein the second SUCI parameter is a next highest priority SUCI parameter in the plurality of SUCI parameters.

10. The UE of claim 7, the at least one processor coupled with the memory and configured to further:
    determine, by the UE and in response to receiving the rejection message including the indication of authentication failure, that all SUCI parameters supported by the UE in the plurality of SUCI parameters have been rejected by the network entity,
    wherein a transmission of the second SUCI comprises transmit, to the network entity and based on the determination, a SUCI based on a NULL SUCI parameter.

11. The UE of claim 7, further comprising:
    receive, from the network entity, a second rejection message including a second indication of authentication failure;
    determine, by the UE and in response to receiving the second rejection message including the second indication of authentication failure, whether all SUCI parameters supported by the UE in the plurality of SUCI parameters have been rejected by the network entity; and
    determine, based on the determination, from the network entity.

12. The UE of claim 7, wherein the network entity is a unified data management (UDM) and wherein transmitting to the network entity comprises transmitting to the UDM via a base station.

13. An apparatus for wireless communication performed by a user equipment (UE), comprising:
    means for receiving, from a network entity, a request message for a subscription concealed identifier (SUCI);
    means for transmitting, to the network entity, a first SUCI based on a first SUCI parameter from a plurality of SUCI parameters available to the UE, wherein the first SUCI parameter is a highest priority SUCI parameter in the plurality of SUCI parameters;
    means for receiving, from the network entity, a rejection message including an indication of authentication failure; and means for transmitting, to the network entity and in response to receiving the rejection message, a second SUCI based on a second SUCI parameter from the plurality of SUCI parameters, wherein the second SUCI parameter is different from the first SUCI parameter and based at least in part on a determination of whether all SUCI parameters supported by the UE in the plurality of SUCI parameters have been rejected by the network entity.

14. The apparatus of claim 13, wherein the first SUCI parameter and the second SUCI parameter are SUCI parameters supported by the UE.

15. The apparatus of claim 13, wherein the second SUCI parameter is a next highest priority SUCI parameter in the plurality of SUCI parameters.

16. The apparatus of claim 13, further comprising:
means for determining, by the UE and in response to receiving the rejection message including the indication of authentication failure, that all SUCI parameters supported by the UE in the plurality of SUCI parameters have been rejected by the network entity,
wherein the means for transmitting the second SUCI comprises means for transmitting, to the network entity and based on the determination, a SUCI based on a NULL SUCI parameter.

17. The apparatus of claim 13, further comprising:
means for receiving, from the network entity, a second rejection message including a second indication of authentication failure;
means for determining, by the UE and in response to receiving the second rejection message including the second indication of authentication failure, that all SUCI parameters supported by the UE in the plurality of SUCI parameters have been rejected by the network entity; and
means for disconnecting, based on the determination, from the network entity.

18. The apparatus of claim 13, wherein the network entity is a unified data management (UDM) and wherein transmitting to the network entity comprises transmitting to the UDM via a base station.

19. A non-transitory computer-readable medium storing code for wireless communication, the code comprising instructions executable by a processor to:
receive, from a network entity, a request message for a subscription concealed identifier (SUCI);
transmit, to the network entity, a first SUCI based on a first SUCI parameter from a plurality of SUCI parameters available to a user equipment (UE), wherein the first SUCI parameter is a highest priority SUCI parameter in the plurality of SUCI parameters;
receive, from the network entity, a rejection message including an indication of authentication failure; and
transmit, to the network entity and in response to receiving the rejection message, a second SUCI based on a second SUCI parameter from the plurality of SUCI parameters, wherein the second SUCI parameter is different from the first SUCI parameter and based at least in part on a determination of whether all SUCI parameters supported by the UE in the plurality of SUCI parameters have been rejected by the network entity.

20. The non-transitory computer-readable medium of claim 19, wherein the first SUCI parameter and the second SUCI parameter are SUCI parameters supported by the UE.

21. The non-transitory computer-readable medium of claim 19, wherein the second SUCI parameter is a next highest priority SUCI parameter in the plurality of SUCI parameters.

22. The non-transitory computer-readable medium of claim 19, the code comprising instructions executable by a processor to further:
determine, by the UE and in response to receiving the rejection message including the indication of authentication failure, that all SUCI parameters supported by the UE in the plurality of SUCI parameters have been rejected by the network entity; and
transmit, to the network entity and based on the determination, a SUCI based on a NULL SUCI parameter.

23. The non-transitory computer-readable medium of claim 19, further comprising:
receive, from the network entity, a second rejection message including a second indication of authentication failure;
determine, by the UE and in response to receiving the second rejection message including the second indication of authentication failure, that all SUCI parameters supported by the UE in the plurality of SUCI parameters have been rejected by the network entity; and
disconnect, based on the determination, from the network entity.

24. The non-transitory computer-readable medium of claim 19, wherein the network entity is a unified data management (UDM) and wherein transmitting to the network entity comprises transmitting to the UDM via a base station.

* * * * *